United States Patent [19]
Rochette et al.

[11] Patent Number: 6,101,377
[45] Date of Patent: *Aug. 8, 2000

[54] METHOD AND APPARATUS FOR IMPROVING MULTI-CHANNEL RADIO COMMUNICATION

[75] Inventors: Gaetan Rochette, 1-401 Athabasca Avenue, Fort McMurray, Alberta, Canada, T9J 1H4; Greg Wengreniuk; Kelly Weiss, both of Edmonton, Canada

[73] Assignees: Gaetan Rochette, Fort McMurray, Canada; John Garfield Moller, Conklin, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/890,644

[22] Filed: Jul. 9, 1997

[30] Foreign Application Priority Data

Feb. 14, 1996 [CA] Canada ................................. 2169504

[51] Int. Cl.⁷ ................ H04Q 7/34; H04Q 7/32
[52] U.S. Cl. ............. 455/226.1; 455/77; 455/158.2; 455/345; 455/115; 455/99; 340/425.5; 340/434; 340/431; 334/86; 116/263

[58] Field of Search .................. 455/226.1, 566, 455/77, 154.1, 345, 158.2, 159.2, 575, 90, 115, 95, 99, 129; 340/425.5, 434, 431, 468, 472, 478; 334/86; 116/263

[56] References Cited

U.S. PATENT DOCUMENTS

| | | | |
|---|---|---|---|
| 3,750,138 | 7/1973 | Burgan et al. | 455/77 |
| 4,112,376 | 9/1978 | Fosnough et al. | 455/77 |
| 4,264,979 | 4/1981 | Gutowski | 455/77 |
| 4,468,814 | 8/1984 | Field | 455/77 |

*Primary Examiner*—Fan S. Tsang
*Assistant Examiner*—Keith Ferguson
*Attorney, Agent, or Firm*—Davis and Bujold

[57] ABSTRACT

A method for improving multi-channel radio communication. Firstly, providing a motor vehicle having a multi-channel radio. Secondly, mounting a visual display device to the motor vehicle in such a manner that the visual display device is visible from a distance to persons observing the motor vehicle. Thirdly, displaying a number representing a channel frequency to which the multi-channel radio is tuned on the visual display device.

3 Claims, 3 Drawing Sheets

METHOD AND APPARATUS FOR IMPROVING MULTI-CHANNEL RADIO COMMUNICATION

FIELD OF THE INVENTION

The present invention relates to a method and apparatus for improving multi-channel radio communication

BACKGROUND OF THE INVENTION

Many highway vehicles are equipped with citizen band (CB) or two way radios. Such radios enable a driver of a vehicle to select one of the channels to broadcast a call for assistance. At any one time there is a strong likelihood that someone will be monitoring the channel upon which the call for assistance has been broadcast and will notify authorities.

However, problems are encountered when one wishes to summon assistance from, or communicate with, a particular vehicle. In order to communicate, one must know which of a plurality of possible channels the driver of the vehicle is monitoring. This requires a person attempting to communicate to broadcast channel by channel until the correct channel is found. If one does not happen upon the correct channel in a timely fashion, the opportunity for communication is lost.

SUMMARY OF THE INVENTION

What is required is a method and apparatus for improving multi-channel radio communication.

According to one aspect of the present invention there is provided a method for improving multi-channel radio communication. Firstly, providing a motor vehicle having a multi-channel radio. Secondly, mounting a visual display device to the motor vehicle in such a manner that the visual display device is visible from a distance to persons observing the motor vehicle. Thirdly, displaying a number representing a channel frequency to which the multi-channel radio is tuned on the visual display device.

Although beneficial results may be obtained through the use of the method, as described above, even more beneficial effects may be obtained when the number is displayed automatically. Automatic display is initiated when means is provided for measuring a channel frequency generated by the multi-channel radio and illuminating lights on the visual display device to display a number of the channel frequency.

According to another aspect of the present invention there is provided an apparatus for improving multi-channel radio communication. A visual display device is provided having a plurality of lights. Means is provided for measuring a channel frequency generated by a multi-channel radio. Means is provided for selectively supplying power to a portion of the lights on the visual display device, such that a number is displayed by the visual display device representing the channel frequency.

According to another aspect of the present invention there is provided, in combination, a motor vehicle having a multi-channel radio, an antenna and a cable extending between the multi-channel radio and the antenna. A visual display device is provided having a plurality of lights. The visual display device is mounted on the motor vehicle in such a manner that the visual display device is visible from a distance to persons observing of the motor vehicle. Means is connected to the cable extending between the multi-channel radio and the antenna for amplifying and measuring a channel frequency generated by the multi-channel radio. Means is provided for selectively supplying power to a portion of the lights of the visual display device, such that a number is displayed by the visual display device representing the channel frequency.

With the method and apparatus, as described above, persons observing the motor vehicle as it passes are immediately aware of the individual channel with which to communicate with the driver of the motor vehicle; such individual channel is displayed on the visual display device connected to the multi-channel radio.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
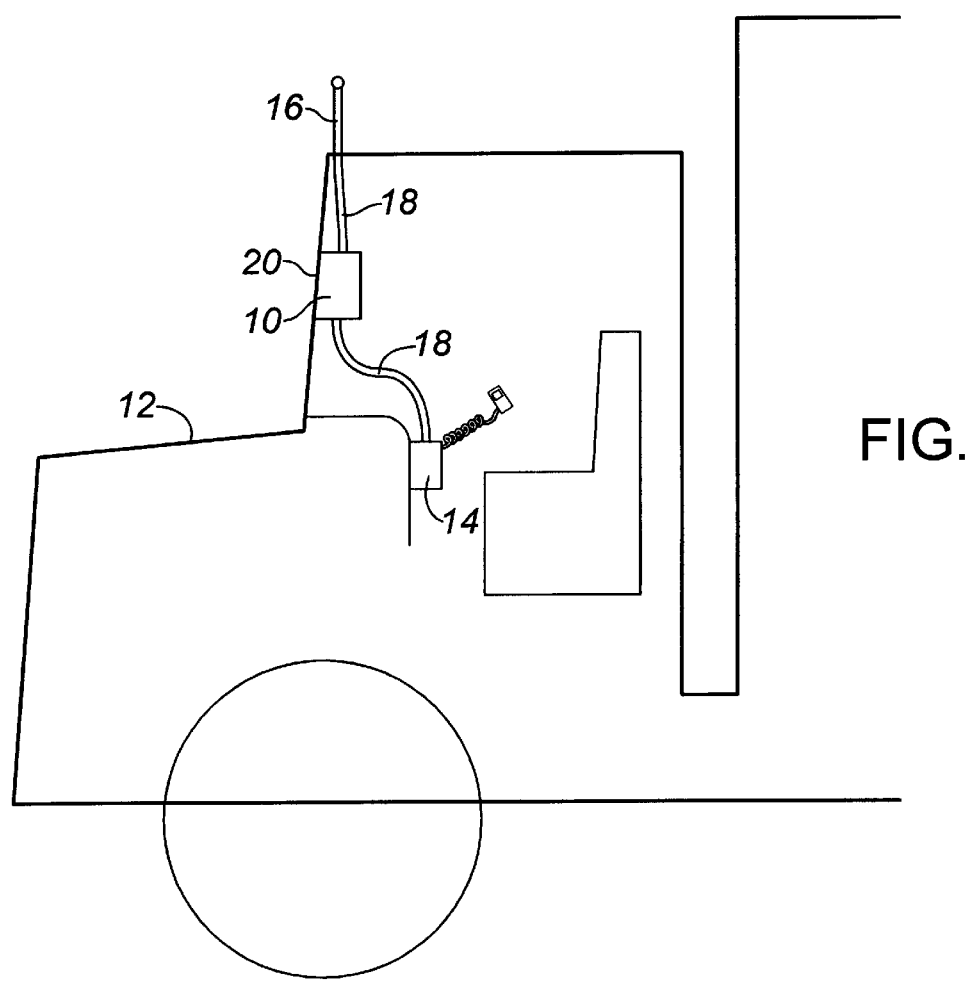
FIG. 1 is a perspective view of a motor vehicle equipped with an apparatus for improving multi-channel radio communication in accordance with the teachings of the present invention.

The preferred method for improving multi-channel radio communication will now be described with reference to FIGS. 1 through 5. A preferred apparatus constructed in accordance with the teachings of the present invention, is generally identified by reference numeral 10 in FIGS. 1 through 5.

Referring to FIG. 1, there is illustrated a motor vehicle 12 into which apparatus 10 has been installed. Motor vehicle 10 is equipped with a multi-channel radio 14 which utilizes an antenna 16. A co-axial cable 18 extends between multi-channel radio 14 and antenna 16. Apparatus 10 has incorporated in its design a visual display 20 that displays a channel frequency of multi-channel radio 14. Apparatus 10 is mounted on motor vehicle 10 in such a manner as to enable visual display 20 to be visible to persons observing from a distance.

Figures 2, 3:
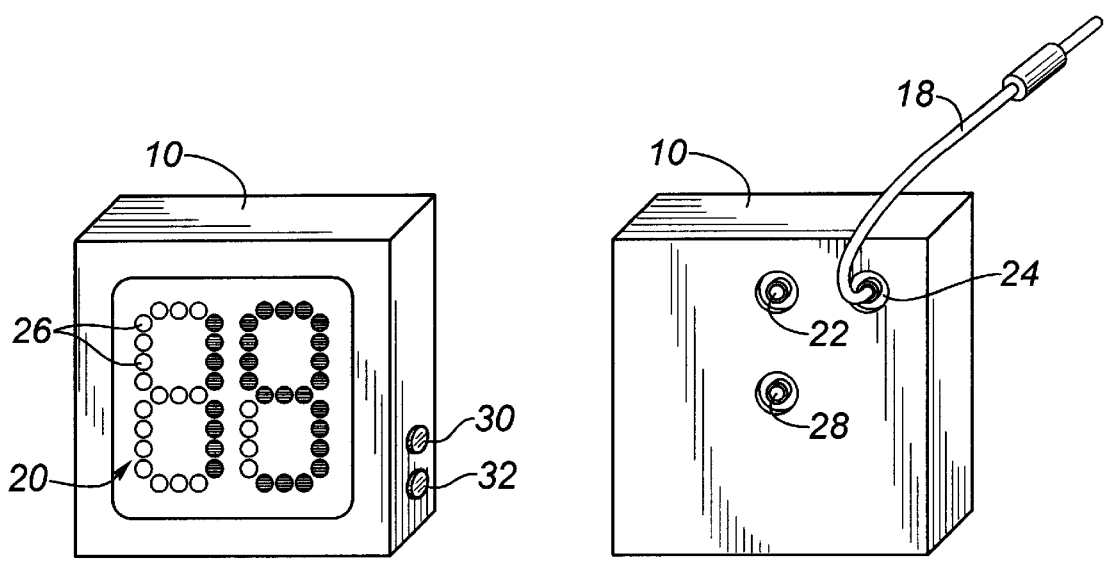
FIG. 2 is a front perspective view of the apparatus illustrated in FIG. 1.
FIG. 3 is a rear perspective view of the apparatus illustrated in FIG. 1.

Referring to FIG. 3 apparatus 10 has an cable input connection 22 and a cable output connection 24. When apparatus 10 is installed, co-axial cable 18 is cut with that portion of co-axial cable 18 leading from antenna 16 connected at cable input connection 22 and that portion of co-axial cable 18 leading to multi-channel radio 14 connected to cable output connection 24. Referring to FIG. 2, visual display 20 has a plurality of lights 26. Referring to FIG. 3, apparatus 10 has a power input connection 28, which is adapted for connection to a power cable leading from a 12 volt power supply provided from motor vehicle 12. Referring to FIG. 2, apparatus 10 has two optic sensors 30 and 32. Optic sensor 30 is a light sensor. Optic sensor 32 is for intensity adjustment.

Figure 4:
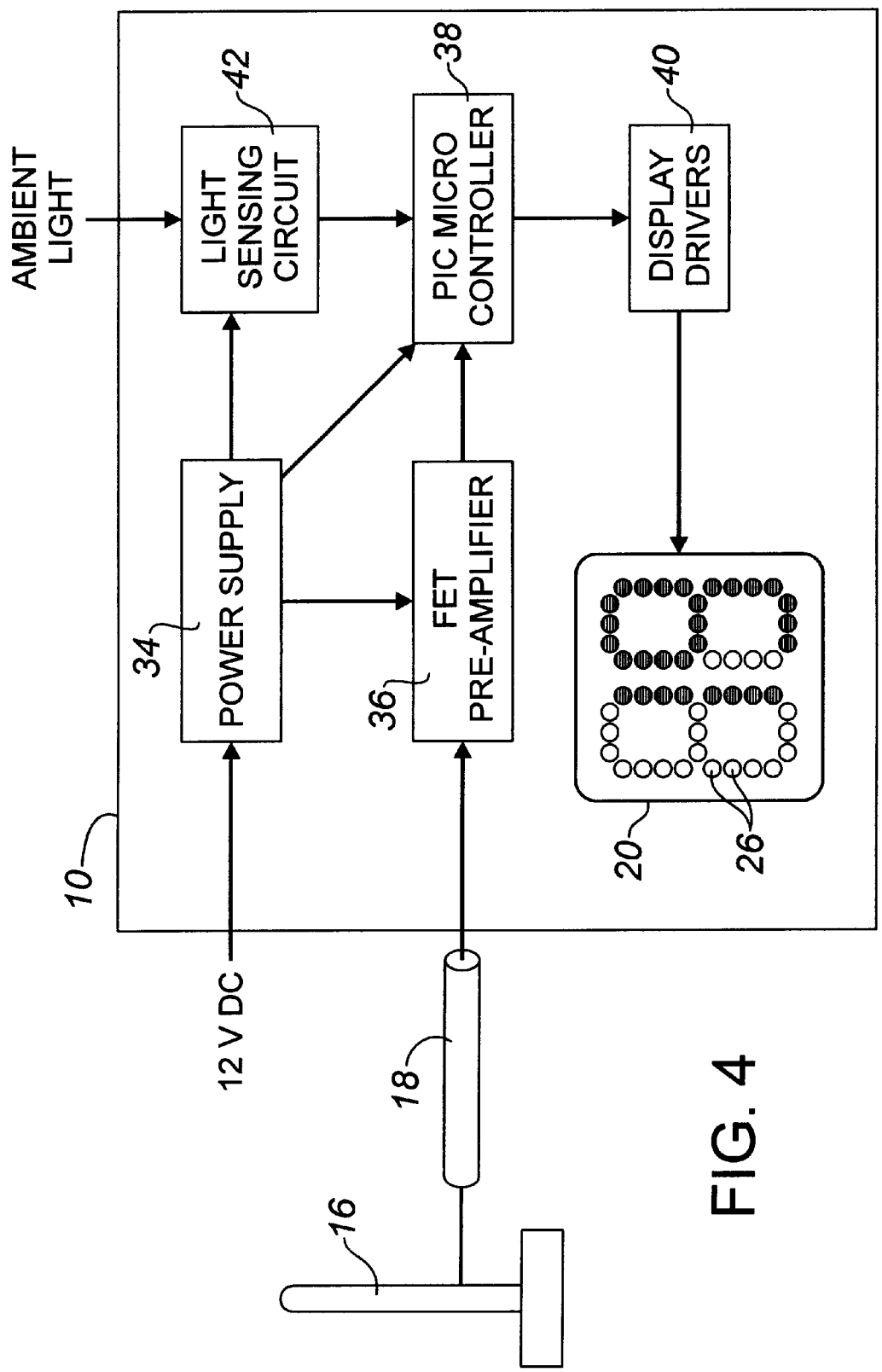
FIG. 4 is a block diagram for the apparatus illustrated in FIG. 2.

Referring to FIG. 4, the basic operating components of apparatus 10 are shown in block diagram form. Block 34, labelled "POWER SUPPLY", receives power input from the 12 volt power supply and reduces that power to a usable 5 volts. Block 36, labelled "PRE-AMPLIFIER" picks up and amplifies the signal passing along co-axial cable 18 between multi-channel radio 14 and antenna 16. The channel frequency can be more readily detected when it is amplified. Amplification also serves a secondary function of ensuring that the process of detecting the channel frequency does not denigrate the performance of multi-channel radio 14. Amplification increases the detected signal from a millivolt level to a 0 to 5 volt level. Block 38, labelled "MICROCONTROLLER", is the control unit. Microcontroller 38 receives the amplified signal from preamplifier 36, and interprets the signal as representing a particular channel frequency. Microcontroller 38 then sends a signal to block 40, labelled "DISPLAY DRIVERS". Microprocessor signals display drivers 40 to selectively supply power to a portion of lights 26 of visual display 20, such that a number is displayed by visual display 20 representing the detected channel frequency. One further block is represented, block 42 labelled "LIGHT SENSING CIRCUIT". The brightness of lights 26 is importance to the proper functioning of apparatus 10. Visual display 20 must be visible in daylight conditions, and yet must not be so bright as to be blinding under cloudy conditions.

Figure 5:
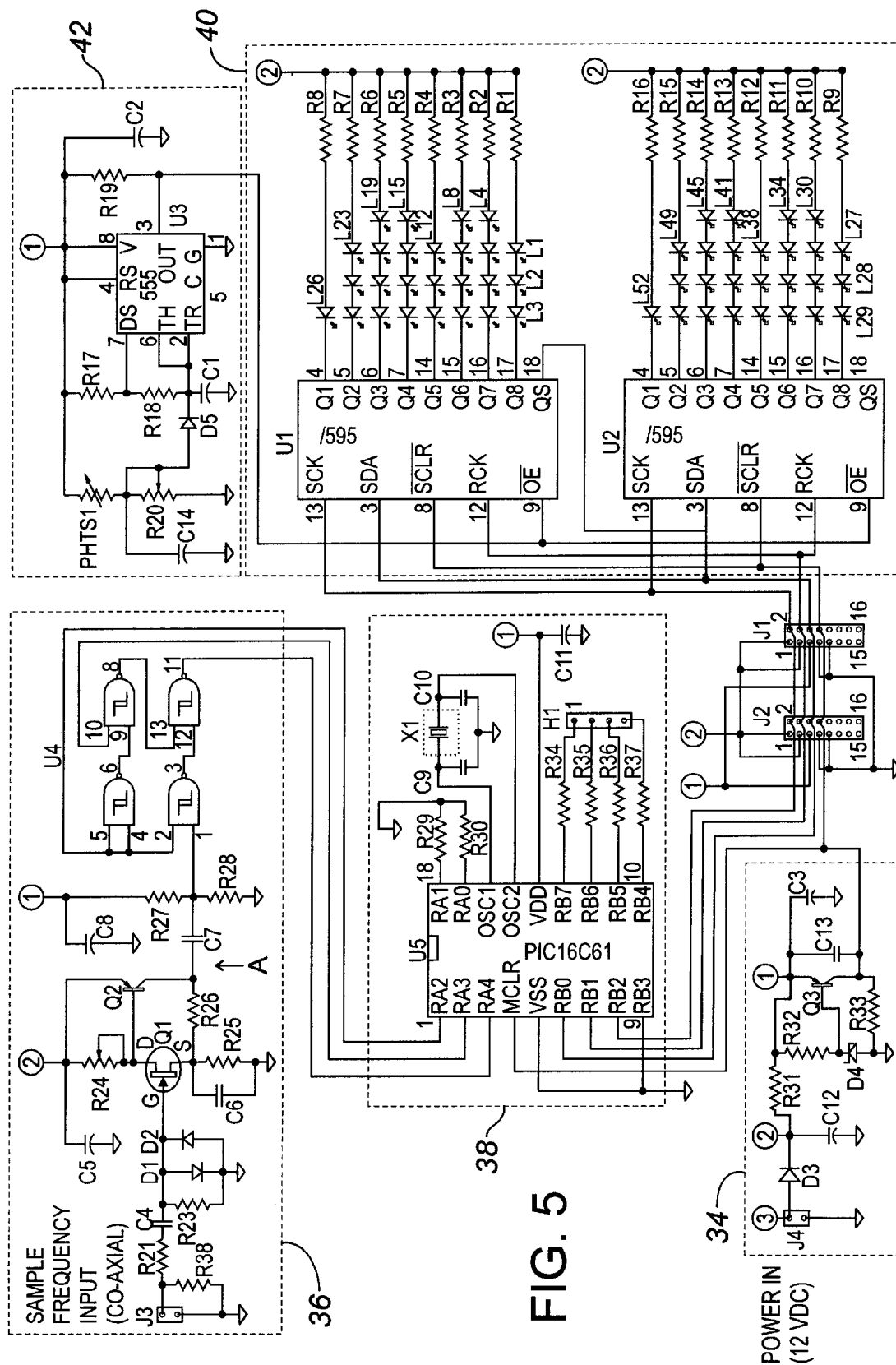
FIG. 5 is a circuit diagram for the apparatus illustrated in FIG. 2.

Referring to FIG. 5, the actual circuits relating to the blocks illustrated in FIG. 4 are illustrated. In POWER SUPPLY block 34, Q3 is a PNP transistor available through Motorola or National as part number 2N4403, C3 is a Radial Elec. Capacitor 100 uf 16 v available through Nichion as part number 100UR16, C12 is a Radial Elec. Capacitor 10 uf 25 v available through Nichion as part number 10UR25, C13 is a Mono Capacitor 100 nf X7R available through AVX as part number 100NM, D3 is a rectifier diode available through Motorola or National as part number 1N4005, D4 is a 4.3 v Zener Diode available through Motorola or National as part number 1N5229, J4 is a 2-pin PC mount connector available through Lumberg as part number Kress-2, R31 is a 150R ½W resistor available through Phillips as part number 150RH, R32 is a 1K ¼W resistor available through Phillips as part number 1K0Q, R33 is a 39K ¼W resistor available through Phillips as part number 39KQ.

In PRE-AMPLIFIER Block 36, Q1 is a J-FET 25V 20 mA available through IR as part number MPF102, Q2 is a PNP transistor available through Motorola or National as part number 2N4403, C4 is a 47 pf ceramic disk capacitor available through Nichion as part number 47PC, C5 and C8 are 100 nf 25 v tantalum capacitors available through ITT as part number 100NT25, C6 is a 470 pf ceramic disk capacitor available through Nichion as part number 470PC, C7 is a 47 nf X7R mono capacitor available through AVX as part number 47NM, D1 and D2 are signal diodes available through Motorola or National as part number 1N4148, J3 is a 2 pin PC mount connector available through Lumberg as part number Kress-2, R21 is a 220R ¼w resistor available through Phillips as part number 220RQ, R23 and R27 are 1M ¼W resistors available through Phillips as part number 1M0Q, R24 is a one turn trimpot 500R resistor available through Phillips as part number 72XR500, R25 is a 100R 104W resistor available through Phillips as part number 100RQ, R26 is a 300R ¼W resistor available through Phillips as part number 300RQ, R28 is a 820K ¼W resistor available through Phillips as part number 820KQ, and R38 is a 2.2K ¼W resistor available through Phillips as part number 2K2Q.

In MICROCONTROLLER Block 38, U5 is a microcontroller available through Microchip as part number PIC 16C61-04/P, X1 is a 4MHzXTAL available through Fox as part number 4.000MHz-HC49, C9 and C10 are 27 pf ceramic disk capacitors available through Nichion as part number 27PC, C11 is a 100 nf X7R mono capacitor available through AVX as part number 100NM, R29 and R30 are 10K ¼W resistors available through Phillips as part number 10KQ, R34, R35, R36, R37 are 2.2K ¼W resistors available through Phillips as part number 2K2Q, and H1 is a 4 pin single row header available through Samtek as part number TSW-104-14-TS.

In DISPLAY DRIVERS Block 40, U1 and U2 are open drain shift registers available through Texas Instruments as part number TPlC6B595; R1, R4, R7, R9, R12, R15 are 330R ½W resistors available through Phillips are part number 330RH; R2, R3, R5, R6, R10, R11, R13, R14 are 220R ½W resistors available through Phillips as part number 220RH; R8 and R16 are 510R ½W resistors available through Phillips as part number 510R11; and L1 through L52 are T1¾ LED available from AND as part number 180TOP.

In LIGHT SENSING CIRCUIT Block 42, U3 is a timer available through Motorola as part number LM555, PHTS1 is a photosensor available through Lenline as part number LDRC-1; C1 and C2 are 100n:E 25V tantalum capacitors available through ITT as part number 100NT25; C14 is a 220 uf 16V capacitor available through Nichion as part number 220UR16; D5 is a signal diode available through Motorola or National as part number 1N4148; R17 is a is a 2.2K ¼W resistor available through Phillips as part number 2K2Q; R18 and R19 are 10K ¼W resistors available through Phillips as part number 10KQ; and R20 is a 2.5K one turn trimpot available through Beckman as part number 72XR2K5.

J1 and J2 are 16 pin dual row headers available through Samtek as parts number TSW-108-14TD and SSW-108-14TD, respectively. A control overflow is provided through U4 which is a 2-input NAND Schmitt Trigger available through National as part number 74HC132.

It will be apparent to one skilled in the art the manner in which apparatus 10 will improve vehicle to vehicle communication and, in appropriate circumstances, save lives. A driver of one vehicle can warn a driver of another vehicle heading in the opposite direction about dangerous road conditions ahead or an accident hidden around a corner. A driver of one vehicle can alert a driver of another vehicle to apparent problems such as smoking of brakes or a shifting load. It opens up direct vehicle to vehicle communication, whether that communication relates to a matter of life and death or merely directions or an answer to an inquiry regarding a good place to stop to eat. It will finally be apparent to one skilled in the art that modifications may be made to the illustrated embodiment without departing from the spirit and scope of the invention as hereinafter defined in the claims.

What is claimed is:

1. A method for improving multi-channel radio communication, comprising the steps of:

firstly, providing a motor vehicle having a multi-channel radio, an antenna and a cable extending from the multi-channel radio to the antenna;

secondly, mounting a visual display device to the motor vehicle in such a manner that the visual display device is visible from a distance to persons observing the motor vehicle, the visual display device having a plurality of lights; and thirdly, providing means for measuring a channel frequency output by the multi-channel radio to the antenna and illuminating lights on the visual display device to display automatically a number representing the channel frequency.

2. An apparatus for improving multi-channel radio communication, comprising:

a visual display device having a plurality of lights; and means for amplifying and measuring a channel frequency of an output signal from a multi-channel radio to a cable extending between the multi-channel radio and an antenna; and means for selectively supplying power to a portion of the lights of the visual display device, such that a number is displayed automatically by the visual display device representing the channel frequency.

3. In combination:

a motor vehicle having a multi-channel radio, an antenna and a cable extending between the multi-channel radio and the antenna;

a visual display device having a plurality of lights, the visual display device being mounted on the motor vehicle in such a manner that the visual display device is visible from a distance to persons observing of the motor vehicle;

means for amplifying and measuring a channel frequency of an output signal from a multi-channel radio to the cable extending between the multi-channel radio and the antenna; and means for selectively supplying power to a portion of the lights of the visual display device, such that a number is displayed automatically by the visual display device representing the channel frequency.

* * * * *